(12) United States Patent
Tsumura et al.

(10) Patent No.: US 10,118,572 B2
(45) Date of Patent: *Nov. 6, 2018

(54) CASE STRUCTURE OF POWER EQUIPMENT UNIT

(71) Applicant: HONDA MOTOR CO., LTD., Tokyo (JP)

(72) Inventors: Yuta Tsumura, Saitama (JP); Jun Ogawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,284

(22) Filed: Aug. 14, 2017

(65) Prior Publication Data

US 2018/0056894 A1  Mar. 1, 2018

(30) Foreign Application Priority Data

Aug. 24, 2016 (JP) ................................ 2016-164010

(51) Int. Cl.
*B60K 1/04* (2006.01)
*B60R 13/07* (2006.01)
(Continued)

(52) U.S. Cl.
CPC ............... *B60R 13/07* (2013.01); *B60K 1/04* (2013.01); *B60K 11/06* (2013.01);
(Continued)

(58) Field of Classification Search
CPC ........... B60R 13/07; B60K 1/04; B60K 11/06; B60K 2001/0422; B60L 11/1879; Y10S 903/952; B60Y 2410/10
See application file for complete search history.

(56) References Cited

U.S. PATENT DOCUMENTS 5,390,754 A * 2/1995 Masuyama .............. B60K 1/04
 105/51
7,654,352 B2 * 2/2010 Takasaki .................. B60K 1/04
 180/65.1
(Continued)

FOREIGN PATENT DOCUMENTS

JP       2001-354039 A       12/2001
JP       2004142524 A *   5/2004   .......... H01M 10/625
(Continued)

OTHER PUBLICATIONS

Mar. 20, 2018, Japanese Office Action issued for related JP Application No. 2016-164010.

*Primary Examiner* — Jacob B Meyer
(74) *Attorney, Agent, or Firm* — Paratus Law Group, PLLC

(57) ABSTRACT

A case structure of a power equipment unit which contains power equipment mounted in a vehicle includes: a case body which contains the power equipment and an upper portion of which is open; a lid member which covers the upper portion of the case body; and a cover member which is attached to the lid member and which covers at least an opening part formed in the lid member, wherein: an intake port for taking in air from outside is formed in the cover member; a space part is formed between the cover member and the lid member; the opening part of the lid member is surrounded by a circumferential wall having a cylindrical shape; and a drain passage communicating with a drain port is connected with an outer circumference of the circumferential wall.

9 Claims, 6 Drawing Sheets

(51) Int. Cl.
  *B60K 11/06* (2006.01)
  *B60L 11/18* (2006.01)
  *B60K 1/00* (2006.01)
(52) U.S. Cl.
  CPC ..... *B60L 11/1879* (2013.01); *B60K 2001/005* (2013.01); *B60K 2001/0422* (2013.01); *B60Y 2410/10* (2013.01); *Y10S 903/952* (2013.01)

(56) References Cited

U.S. PATENT DOCUMENTS

| | | | | |
|---|---|---|---|---|
| 7,815,448 B2* | 10/2010 | Kawai | ................ | B60L 11/1822 439/157 |
| 8,789,634 B2* | 7/2014 | Nitawaki | ................ | B60K 1/04 180/68.5 |
| 9,038,757 B2* | 5/2015 | Ogushi | ................ | B60K 1/04 180/68.5 |
| 9,205,757 B2* | 12/2015 | Matsuda | ................ | B62K 11/04 |
| 9,308,829 B2* | 4/2016 | Matsuda | ................ | B62J 9/00 |
| 9,463,695 B2* | 10/2016 | Matsuda | ................ | B62K 11/04 |
| 9,499,057 B2* | 11/2016 | Takishita | ................ | B60L 3/00 |
| 9,925,857 B1* | 3/2018 | Tsumura | ................ | B60K 1/04 |
| 2001/0030069 A1* | 10/2001 | Misu | ................ | B60K 1/04 180/68.1 |
| 2004/0235315 A1* | 11/2004 | Masui | ................ | B60K 1/04 439/34 |
| 2009/0152034 A1* | 6/2009 | Takasaki | ................ | B60K 1/04 180/68.5 |
| 2009/0197154 A1* | 8/2009 | Takasaki | ................ | B60K 1/04 429/83 |
| 2009/0197456 A1* | 8/2009 | Kawai | ................ | B60L 11/1822 439/465 |
| 2009/0236162 A1* | 9/2009 | Takasaki | ................ | B60K 1/04 180/68.5 |
| 2009/0242299 A1* | 10/2009 | Takasaki | ................ | B60K 1/04 180/68.5 |
| 2012/0160584 A1* | 6/2012 | Nitawaki | ................ | B60K 1/04 180/68.5 |
| 2012/0175177 A1* | 7/2012 | Lee | ................ | B60K 1/04 180/68.5 |
| 2013/0146373 A1* | 6/2013 | Kosaki | ................ | B60K 1/04 180/65.1 |
| 2013/0319779 A1* | 12/2013 | Nitawaki | ................ | B60L 11/1874 180/68.5 |
| 2014/0191556 A1 | 7/2014 | Krenz et al. | | |
| 2014/0262568 A1* | 9/2014 | Matsuda | ................ | B60K 1/04 180/65.1 |
| 2014/0262573 A1* | 9/2014 | Ito | ................ | B60K 1/04 180/68.5 |
| 2014/0299393 A1* | 10/2014 | Matsuda | ................ | B62J 9/00 180/65.1 |
| 2014/0326524 A1* | 11/2014 | Ogushi | ................ | B60K 1/04 180/68.5 |
| 2014/0367183 A1* | 12/2014 | Matsuda | ................ | B62K 11/04 180/220 |
| 2016/0039263 A1 | 2/2016 | Mori et al. | | |
| 2016/0121752 A1* | 5/2016 | Takeyama | ................ | B60L 11/1896 180/68.5 |
| 2018/0056894 A1* | 3/2018 | Tsumura | ................ | B60K 1/04 |
| 2018/0065458 A1* | 3/2018 | Ogawa | ................ | B60K 1/04 |
| 2018/0065459 A1* | 3/2018 | Tsumura | ................ | B60K 1/04 |

FOREIGN PATENT DOCUMENTS

| | | | | |
|---|---|---|---|---|
| JP | 2007-050802 A | | 3/2007 | |
| JP | 2007050802 A | * | 3/2007 | |
| JP | 2010-285070 A | | 12/2010 | |
| JP | 2012-084639 A | | 4/2012 | |
| JP | 2012-099288 A | | 5/2012 | |
| JP | 2013-252731 A | | 12/2013 | |
| JP | 2014-015178 A | | 1/2014 | |
| JP | 2014015178 A | * | 1/2014 | |
| JP | 2014-034274 A | | 2/2014 | |
| JP | 2015-217820 A | | 12/2015 | |
| JP | 2016153279 A | * | 8/2016 | ......... H01M 10/625 |
| WO | WO 2013/073463 A1 | | 5/2013 | |
| WO | WO 2014/162892 A1 | | 10/2014 | |

* cited by examiner

CASE STRUCTURE OF POWER EQUIPMENT UNIT

CROSS-REFERENCE TO RELATED APPLICATION(S)

This application claims priority from Japanese Patent Application No. 2016-164010 filed on Aug. 24, 2016, the entire contents of which are incorporated herein by reference.

TECHNICAL FIELD

The present invention elates to a case structure of a power equipment unit which contains power equipment such as a vehicle driving battery.

BACKGROUND ART

A battery (battery module) is mounted on a hybrid vehicle which travels using an engine and a motor in combination, an electric vehicle which travels only using a motor, and the like to store electric power and supply the electric power to the motor (for example, Patent Literatures 1 and 2). The battery is contained generally as a part of a power equipment unit in a case together with high-voltage electric components including an inverter and the like.

The case of the power equipment unit has an intake port for taking cooling air into the case. In a case where an occupant spills a large amount of liquid such as drink near the power equipment unit, there is a risk that the liquid flows from the intake port into the case of the power equipment unit. When the large amount of liquid flows into the case of the power equipment unit, there is a risk that the battery is flooded.

PRIOR ART LITERATURE

Patent Literature

[Patent Literature 1]: JP-A- 2010-285070
[Patent Literature 2]: JP-A-2012-099288

SUMMARY OF THE INVENTION

Problem that the Invention is to Solve

From such reasons, the intake port of the case desirably adopts such a structure that the liquid is not easily infiltrated into the case, for example, even in a case where the large amount of liquid is spilled.

The present invention provides to a base structure of a power equipment unit which can effectively prevent that liquid reaches power equipment even in a case where the liquid is infiltrated from an intake port.

Means for Solving the Problem

The present invention provides following aspects.

A first aspect is a case structure of a power equipment unit (e.g., a power equipment unit 20 in embodiment) which contains an power equipment (e.g., a battery 50 in embodiment) mounted in a vehicle (e.g., a vehicle 1 in embodiment), the case structure including:

a case body (e.g., a case body 31 in embodiment) which contains the power equipment and an upper portion of which is open;

a lid member (e.g., a lid member 40 in embodiment) which covers the upper portion of the case body; and a cover member (e.g., a cover member 60 in embodiment) which is attached to the lid member and which covers at least an opening part (e.g., an opening part 41 in embodiment) formed in the lid member, wherein an intake port (e.g., an intake port 65 in embodiment) for taking in air from outside is formed in the cover member, a space part (e.g., a space part 71 in embodiment) is formed between the cover member and the lid member, the opening part of the lid member is surrounded by a circumferential wall (e.g., a circumferential wall 42 in embodiment) having a cylindrical shape, and a drain passage (e.g., a drain passage 44 in embodiment) communicating with a drain port (e.g., a drain port 45 in embodiment) is connected with an outer circumference of the circumferential wall.

A second aspect is the case structure of the power equipment unit according to the first aspect, wherein a recess part (e.g., a recess part 43 in embodiment) having an annular shape is provided in the outer circumference, and the drain passage is connected with the recess part.

A third aspect is the case structure of the power equipment unit according to the second aspect, wherein the recess part and the drain passage are formed by concaving the lid member.

A fourth aspect is the case structure of the power equipment unit according to any one of the first to third aspects, wherein the intake port is provided on one surface (e.g., a front wall 62 in embodiment) of the vehicle in a front and rear direction, and the drain port is provided on an other surface (e.g., a rear vertical wall 46 in embodiment) of the vehicle in the front and rear direction.

A fifth aspect is the case structure of the power equipment unit according to any one of the first to fourth aspects, wherein the drain passage is tilted downward toward the drain port.

A sixth aspect is the case structure of the power equipment unit according to any one of the first to fifth aspects, wherein in the cover member, a partition wall part (e.g., a partition wall part 73 in embodiment) is provided between the intake port and the opening part to extend downward from an upper wall (e.g., an upper wall 61 in embodiment), and a lower end of the partition wall part is positioned below an upper end of the opening part and below a lower end of the intake port.

A seventh aspect is the case structure of the power equipment unit according to any one of the first to sixth aspects, wherein the power equipment includes a vehicle driving battery (e.g., the battery 50 in embodiment).

An eighth aspect is the case structure of the power equipment unit according to any one of the first to seventh aspects, wherein the power equipment unit is arranged under a seat (e.g., a front seat 5 in embodiment).

A ninth aspect is the case structure of the power equipment unit according to the eighth aspect, wherein the intake port is arranged to be positioned under the seat even in a state where the seat moves to a most front side or a most rear side of the vehicle.

Advantage of the Invention

According to the first aspect, the liquid infiltrated from the intake port can be drained from the drain port through the drain passage without being infiltrated into the opening part of the lid member. In addition, the drain port can be used also as an auxiliary intake port in a case where the intake port is blocked, and thus the drain port has an auxiliary intake function in addition to the drain function.

According o the second aspect, the angular recess part is provided in the outer circumference of the circumferential wall, and the drain passage is connected with the recess part. Thus, the liquid infiltrated from the intake port can be temporally stored in the recess part, and thus it is possible to drain while controlling flow of the liquid.

According to the third aspect, the recess part and the drain passage are formed by concaving the lid member. Thus, it is not necessary to provide a component for draining additionally, and thus it is possible to prevent an increase in the number of the components.

According to the fourth aspect, the intake port and the drain port are provided on surfaces different in the front and rear direction. Thus, the liquid accumulated in the recess part can he drained from the drain port during hill-climbing or hill-descending or during acceleration or deceleration, Further, the intake port and the drain port are open in different surfaces. Thus, drainage can be performed smoothly by taking in air through the intake port during draining from the drain port.

According to the fifth aspect, the drain passage is tilted downward toward the drain port. Thus, it is prevented that the liquid is stored in the drain passage, and thus it is possible to drain smoothly.

According to the sixth aspect, in the cover member, the partition wall part is provided between the intake port and the opening part to extend downward from the upper wall, and the lower end of the partition wall part is positioned below the upper end of the opening part and below the lower end of the intake port. Thus, even in a case where liquid is infiltrated vigorously from the intake port, it can be prevented that the liquid reaches the opening part with maintaining the momentum.

According to the seventh aspect, the vehicle driving battery is cooled by the air taken in from the intake port, and thus, it is possible to avoid a risk that the battery is exposed to the liquid.

According to the eighth aspect, normally, even in a case where the occupant seating the seat spills liquid such as a drink held within container, the liquid rarely reaches the lower side of the seat, and thus, it can be effectively prevented that the liquid is infiltrated from the intake port into the case body. That is, even in a case where the intake port is arranged below the seat, the power equipment can be cooled without getting the power equipment wet by securing cooling air through a narrow gap between the floor surface and the seat. Further, it is possible to reduce unpleasantness of the occupant due to the effect of noise during cooling.

According to the ninth aspect, the intake port is arranged to be positioned under the seat even in a state where the seat moves to a most front side or a most rear side of the vehicle. Thus, it is possible to prevent the infiltration of the liquid more effectively.

MODE FOR CARRYING OUT THE INVENTION

Figure 1:
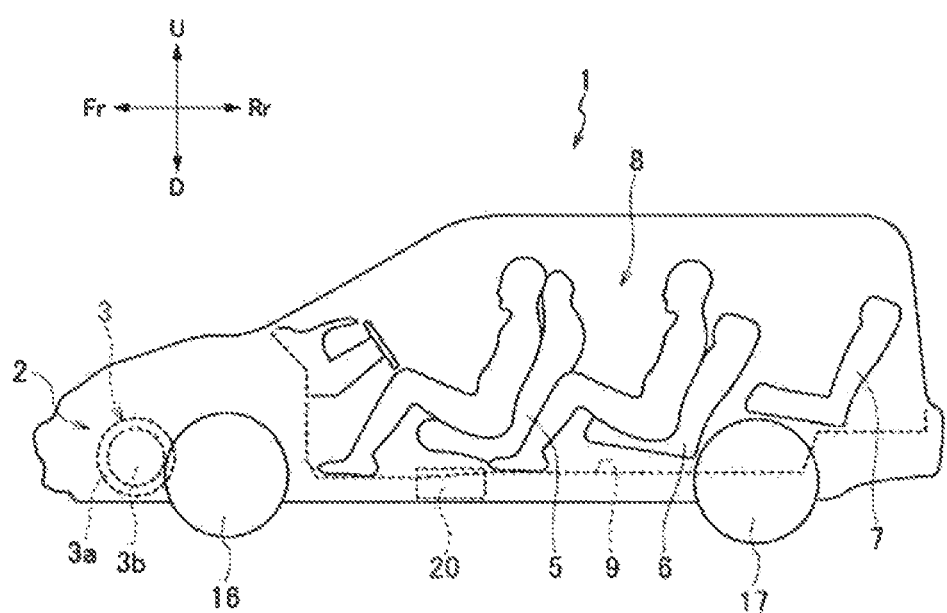
FIG. 1 is a schematic view illustrating a hybrid vehicle provided with a power equipment unit according to one embodiment of the present invention.

Hereinafter, one embodiment of the present invention will be described in detail with reference to the accompanying drawings. Incidentally, the drawings are viewed in directions indicated by reference numerals. In the following description, a front and rear side, a right and left side, and a vertical side follow directions in which a driver views. In the drawings, the front side of the vehicle is indicated by Fr, the rear side is indicated by Rr, the left side is indicated by L, and the right side is indicated. by R, the upper side is indicated by U, and the lower side is indicated by D.

FIG. 1 is a schematic view illustrating a hybrid vehicle in which a power equipment unit according to one embodiment of the present invention is mounted. The vehicle 1 is mounted with a power unit 3 in which an engine 3a and a motor generator 3b are installed in series in an engine room 2 in the front side of the vehicle. For example, the motor generator 3b is a three-phase AC motor. The vehicle 1 is a hybrid vehicle which is driven by the engine 3a and/or the motor generator 3b, and is capable of recovering electric power from the motor generator 3b during vehicle deceleration and the like.

In the vehicle 1, a driving force of the engine 3a and the motor generator 3b is transmitted to a front wheel 16 which is a driving wheel. A rear wheel 17 is a driven wheel. In addition, when the driving force is transmitted from the front wheel 16 to the motor generator 3b during deceleration of the vehicle 1 and the like, the motor generator 3b functions as a generator to generate a so-called regenerative braking force so that kinetic energy of the vehicle 1 is recovered as electric energy. The recovered electric energy is charged in a battery 50 (see FIG. 2) through an electric power converter such as an inverter included in a high-voltage device to be described later.

At the rear side of the engine 2, a passenger compartment 8 is provided in which a front seat 5, a middle seat 6, and a rear seat 7 are arranged.

Figure 2:
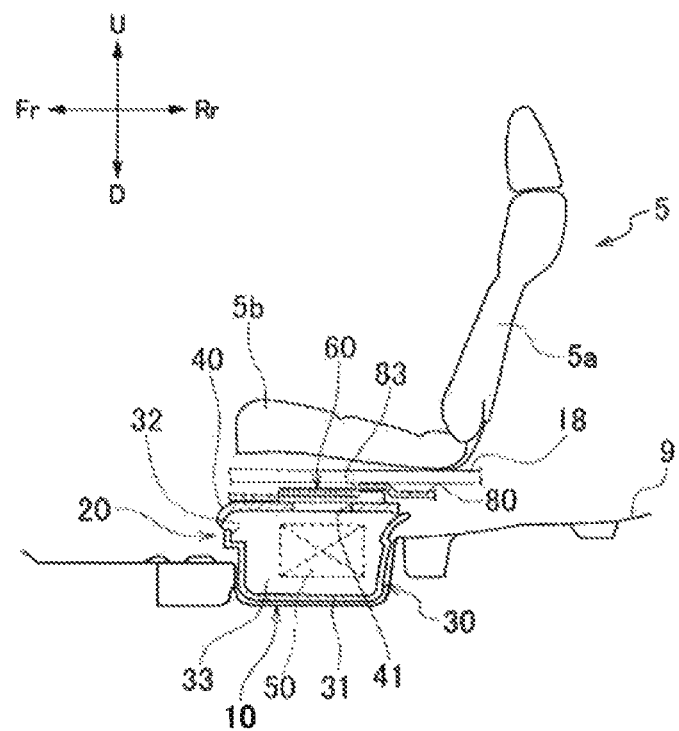
FIG. 2 is a schematic side view (partially sectional view) of the power equipment unit and a seat.

A power equipment unit 20 connected with the power unit 3 through an electric power cable (not illustrated) is arranged on the lower side of the front seat 5 (a driver's seat and a front passenger's seat) in the passenger compartment 8. FIG. 2 is a schematic side view (partially sectional view)

of the power equipment unit 20 and the front seat 5. All components within the power equipment unit 20 excluding the battery 50 are not illustrated.

As illustrated in FIG. 2, the front seat 5 is provided on the upper side of a floor panel 9 in the passenger compartment 8. The front seat 5 includes a back rest part 5*a* and a seat part 5*b*, and is attached in a seat rail 18 extending on the upper side of the floor panel 9 in a front and rear direction, so as to be supported to be slidingly movable in the same direction.

A concave power equipment unit containing part 10 is provided on the lower side of the front seat 5 of the floor panel 9, and the power equipment unit 20 is contained in the power equipment unit containing part 10. The power equipment unit 20 is a unit which includes the battery 50, the high-voltage device and a power distribution component (not illustrated) for controlling giving and receiving of the electric power of the battery 50, a main switch (not illustrated) for the battery 50, and a case 30 which contains those components.

The ease 30 of the power equipment unit 20 includes a container-shaped case body 31 having a bottom, a lid member 40 which covers the upper portion of the case body 31, and a cover member 60 which covers an opening part 41 provided in the lid member 40. The battery 50, the high-voltage device, the power distribution component (high-voltage power distribution component) and the like are contained inside the case body 31. The case body 31 is shaped in a bottomed container which has an opening 32 directed to the upper side of the vehicle 1. The interior thereof serves as a containing part 33 for containing the battery 50 and the like. The lid member 40 is a substantially plate-shaped member which blocks the opening 32 of the case body 31.

Although not illustrated in detail, the battery 50 is provided in a state where a plurality of battery cells are bundle together. In addition, the high-voltage device is an electronic equipment including the inverter and a DC/DC converter. Electronic equipment such as ECU is also provided in the high-voltage device. By the function of the high-voltage device, direct current is obtained from the battery 50, the direct current is converted into three-phase alternating current, the current is supplied to the motor generator 3*b* to drive it, and regenerative current from the motor generator 3*b* is converted into direct current, thereby enabling the battery 50 to be charged.

Figure 3A:
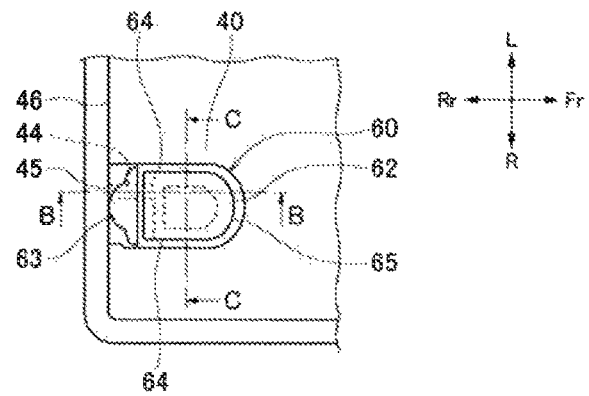
FIG. 3A is a plan view illustrating a configuration of a lid member and a cover member of the power equipment unit.
Figure 3B:
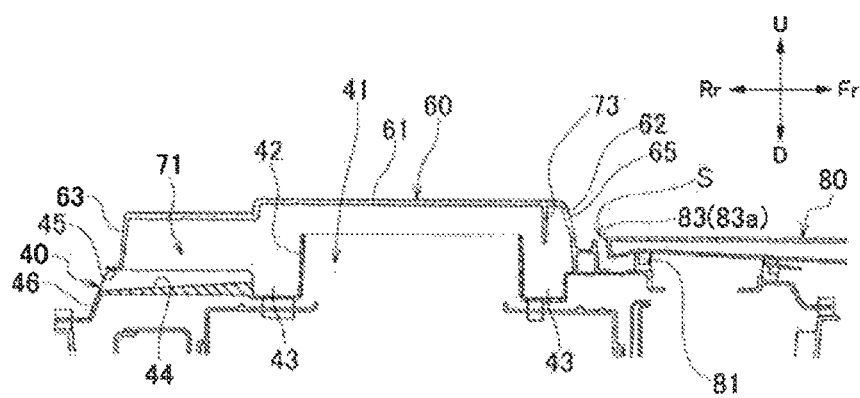
FIG. 3B is a sectional view taken along an arrow B-B of FIG. 3A.
Figure 3C:
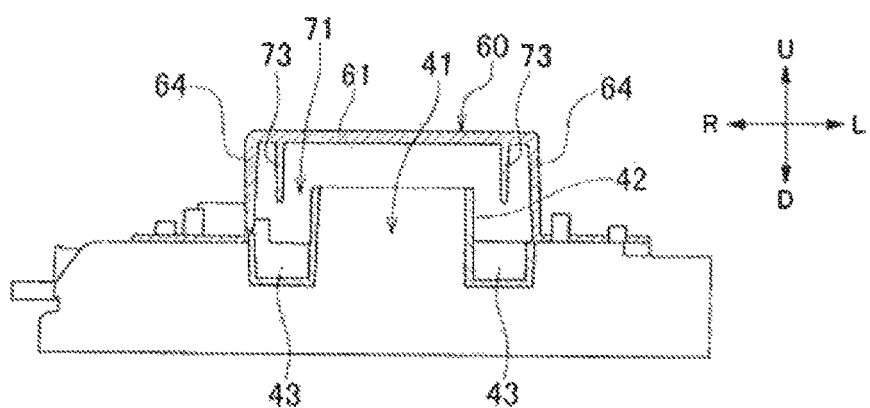
FIG. 3C is a sectional view taken along an arrow C-C of FIG. 3A.
Figure 4:
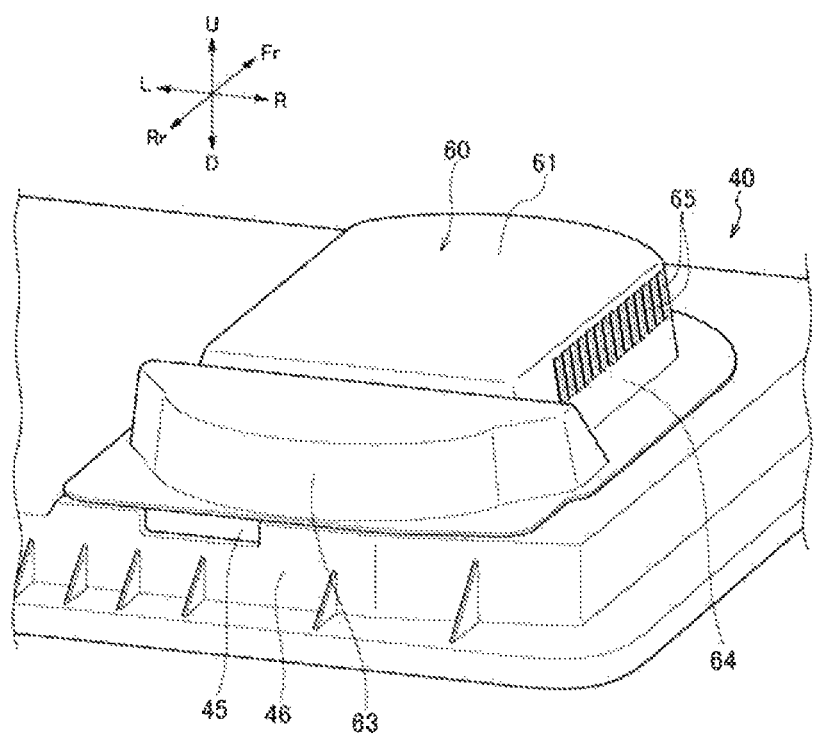
FIG. 4 is a perspective view partially illustrating the lid member and the cover member of the power equipment unit.

FIGS. 3A to 3C illustrate the configurations of the lid member 40 and the cover member 60 of the power equipment unit 20. FIG. 3A is a plan view. FIG. 3B is a sectional view taken along an arrow B-B of FIG. 3A. FIG. 3C is a sectional view taken along an arrow C-C of FIG. 3A. FIG. 4 is a perspective view partially illustrating the lid member 40 and the cover member 60 of the power equipment unit 20.

The lid member 40 is attached to cover the upper portion of the case body 31, and the entire body thereof has a substantially plate shape. The opening part 41 formed of an elliptic through hole communicating with the inside of the case body 31 is formed in the lid member 40. A circumferential wall 42 having a cylindrical shape which surrounds the opening part 41 is provided on the upper surface side of the lid member 40. In addition, a recess part 43 concaved in downward is formed on the outer circumferential side of the circumferential wall 42. The recess part 43 is formed circumferentially in all directions of the opening part 41 to surround the outer circumference of the circumferential wall 42. That is, the circumferential wall 42 is surrounded by the recess part 43. By the circumferential wall 42, the upper end of the opening part 41 reaches a position higher than the circumference of the recess part 43 of the lid member 40.

The cover member 60 includes an upper wall 61, which is arranged on the upper surface side of the lid member 40 to cover the opening part 41 and the upper side of the vicinity thereof; and a front wall 62, a rear wall 63, and the right and left side walls 64 which extend downward from the circumferential edge of the upper wall 61. In addition, an intake port 65 formed of a plurality of slit-shaped through holes is formed in the front wall 62 of the cover member 60. The intake port 65 is provided in the entire front wall 62 of the cover member 60 and a portion (a portion of the side wall 64 on the front side) of the side wall 64. The intake port 65 is an intake port for taking cooling air into the power equipment unit 20, and the air taken in from the intake port 65 cools the battery 50 and the like through the opening part 41 of the lid member 40.

The power equipment unit 20 has a space part 71 surrounded by the cover member 60 and the lid member 40. A partition wall part 73 having a thin-plate shape which extends just downward from the upper wall 61 of the cover member 60 to oppose the intake port 65 is provided in the space part 71. The lower end of the partition wall part 73 is positioned below the upper end of the opening part 41 (circumferential wall 42) and below the lower end of the intake port 65. By partitioning the intake port 65 and the opening part 41 by the partition wall part 73, a passage which reaches from the intake port 65 to the opening part 41 becomes a complicated labyrinth shape. The partition wall part 73 extends on the left side and the right side of the opening part 41 as well as the front side of the opening part 41.

A drain passage 44 which communicates with a drain port 45 formed in a rear vertical wall 46 of the lid member 40 is connected with the rear end of the recess part 43. That is, the recess part 43 communicates with the outside of the space part 71 (power equipment unit 20) through the drain passage 44 and the drain port 45. Similarly to the recess part 43, the drain passage 44 is formed by concaving the lid member 40. The drain passage 44 is a tilted surface which is tilted downward toward the drain port 45 from a connection part with the recess part 43. The bottom surface of the recess part 43 may be a horizontal plane, and may be a tilted surface in which the connection part with the drain passage 44 is set as a lowermost portion. Incidentally, in this embodiment, the bottom surface of the recess part 43 is described as a horizontal plane.

As illustrated in FIGS. 2 and 3B, a carpet (floor carpet) 80 laid on the floor surface in the passenger compartment 8 is provided on the upper surface side of the lid member 40. The carpet 80 is attached (stuck) on the upper surface of the lid member 40, the upper surface of the end of the cover member 60, and the like by a hook-and-loop fastener (fixture) 81. The cover member 60 and the intake port 65 are exposed on the upper surface side of the carpet 80 through a cutout portion 83 formed in the carpet 80. Therefore, in a portion except the cover member 60 of the power equipment unit 20, the upper surface side thereof is covered by the carpet 80. Further, as illustrated in FIG. 3B, the front end of the cover member 60 is arranged to abut an end (inner edge) 83*a* of the cutout portion 83 of the opposing carpet 80. However, a slight gap S is formed between the end of the cover member 60 and the end 83*a* of the cutout portion 83. With the configuration, even in a case where liquid such as drink is spilled on the carpet 80, it can be avoided that the liquid is easily infiltrated from the intake port 65 into the cover member 60.

Figure 5A:
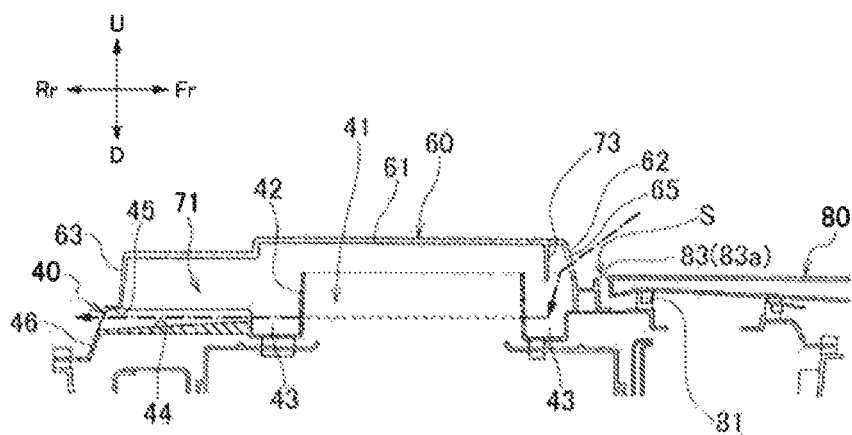
FIG. 5A is a view for explaining a case where liquid is infiltrated from an intake port, and is a sectional view in a state where the vehicle travels a flat road deceleratingly.
Figure 5B:
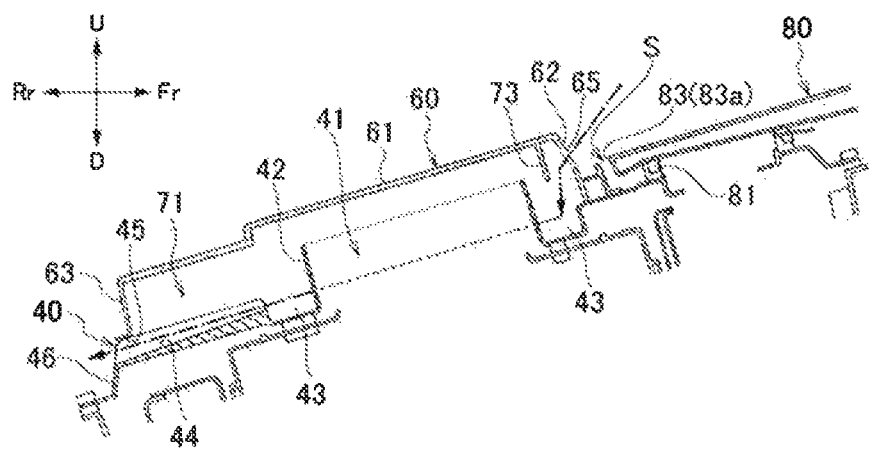
FIG. 5B is a view for explaining a case where the liquid is infiltrated from the intake port, and is a sectional view illustrating a state where the vehicle travels an upsloped road.

FIGS. 5A and 5B are views for explaining a case where liquid such as water is infiltrated from the intake port 65. FIG. 5A is a view illustrating a state where the vehicle 1 travels the flat road deceleratingly, and FIG. 5B is a view illustrating a state where the vehicle 1 travels the upsloped road. As illustrated in the same drawings, in a case where a large amount of liquid such as water is spilled in the vicinity of the front seat 5 in the passenger compartment 8, the liquid may be infiltrated from the intake port 65 of the cover member 60 into the case 30. In this case, the liquid infiltrated from the intake port 65 enters into the recess part 43 of the opening part 41 on the front side, and is guided to the space part 71 therefrom. In this case, in a case where the liquid is vigorously infiltrated from the intake port 65, the liquid is caught by the partition wall part 73 to drip just downward, and enters into the recess part 43. By such a partition wall part 73, it can be prevented that the liquid infiltrated from the intake port 65 reaches the opening part 41 with maintaining the momentum.

The liquid reaching the space part 71 in this manner flows the space part 71 from the front side to the rear side when the vehicle 1 travels deceleratingly as illustrated in FIG. 5A or in a case where the vehicle 1 travels the upsloped road so that the vehicle 1 is tilted in the front and rear direction as illustrated in FIG. 5B. Since the drain passage 44 is connected with the recess part 43, the liquid flowing the space part 71 from the front side to the rear side is discharged from the drain port 45 outside the space part 71 through the drain passage 44. Accordingly, the liquid such as water infiltrated from the intake port 65 can be prevented from entering into the case body 31 from the opening part 41, and thus is discharged outside from the space part 71.

As described above, according to the power equipment unit 20 of this embodiment, in the space part 71 between the cover member 60 and the lid member 40, the opening part 41 formed in the lid member 40 is surrounded by the cylindrical circumferential wall 42, the circumferential wall 42 is surrounded by the annular recess part 43, and the drain passage 44 communicating with the drain port 45 is connected with the recess part 43. Thus, the liquid infiltrated from the intake port 65 can be drained from the drain port 45 through the drain passage 44 without being infiltrated into the opening part 41 of the lid member 40. In addition, the drain port 45 can be also used as an auxiliary intake port in a case where the intake port 65 is blocked, and thus the drain port 45 has an auxiliary intake function in addition to the drain function. Therefore, even in a case where the intake port 65 is blocked, it is possible to secure the cooling air necessary to cool the battery 50, and thus it is possible to maintain a cooling function when the intake port 65 is blocked.

Since the intake port 65 is formed in the cover member 60, it is not necessary to extend an intake duct from the power equipment unit 20, and it is possible to secure an interior space of the passenger compartment widely while reducing the number of components.

Since the recess part 43 and the drain passage 44 formed in the lid member 40 are formed by concaving the lid member 40, it is not necessary to provide a component for draining additionally, and thus it is possible to prevent an increase in the number of the components.

The intake port 65 is formed in the front wall 62 of the cover member 60, and the drain port 45 is formed in the rear vertical wall 46 of the lid member 40. Thus, the liquid accumulated in the recess part 43 during deceleration and hill-climbing of the vehicle 1 can be drained from the drain port 45. Incidentally, the drain port 45 may be formed in a front vertical wall of the lid member 40 as well as the intake port 65 is formed in the rear wail 63. In this case, the liquid accumulated in the recess part 43 during acceleration and hill-descending of the vehicle 1 can be drained from the drain port 45. In addition, the intake port 65 and the drain port 45 are open in surfaces of the vehicle 1 which are different in the front and rear direction, and thus drainage can be performed smoothly by taking in air through the intake port 65 during draining from e drain port 45.

Since the drain passage 44 is tilted downward toward the drain port 45, it is prevented that the liquid is stored in the drain passage 44, and thus it is possible to drain smoothly.

In the cover member 60, the partition wall part 73 is provided between the intake port 65 and the opening part 41 to extend downward from the upper wall 61, and the lower end of the partition wall part 73 is positioned below the upper end of the opening part 41 (circumferential wall 42) and below the lower end of the intake port 65. Thus, even in a case where liquid is infiltrated vigorously from the intake port 65, it can he prevented that the liquid reaches the opening part 41 with maintaining the momentum.

Since the power equipment unit 20 is arranged below the front seat 5, normally, even in a case where the occupant seating the front seat 5 spills liquid such as drink held by container, the liquid rarely reaches the lower side of the front seat 5, and thus, it can be effectively prevented that the liquid is infiltrated from the intake port 65 into the case body 31. That is, even in a case where the intake port 65 is arranged below the front seat 5, the battery 50 can be cooled without getting the battery 50 wet by securing cooling air through a narrow gap between the floor surface and the front seat 5. Further, it is possible to reduce unpleasantness of the occupant due to the effect of noise during cooling.

Figure 6A:
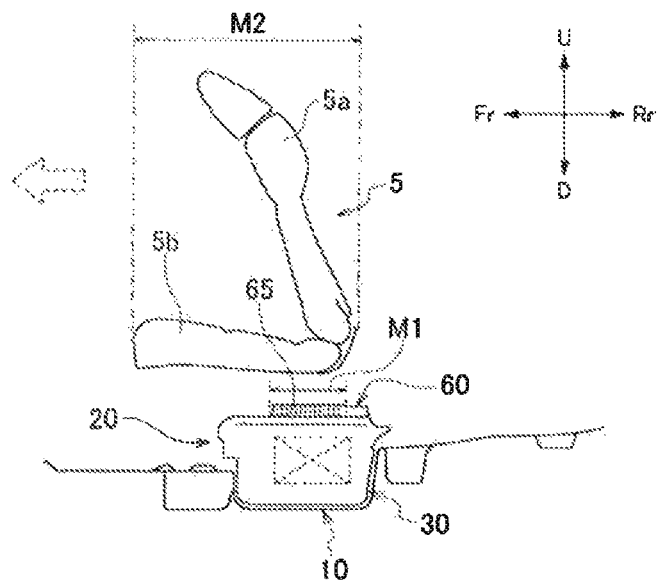
FIG. 6A is a schematic side view illustrating an arrangement configuration of the power equipment unit with respect to a front seat, and is a view illustrating a state where the front seat is positioned on a most front side.
Figure 6B:
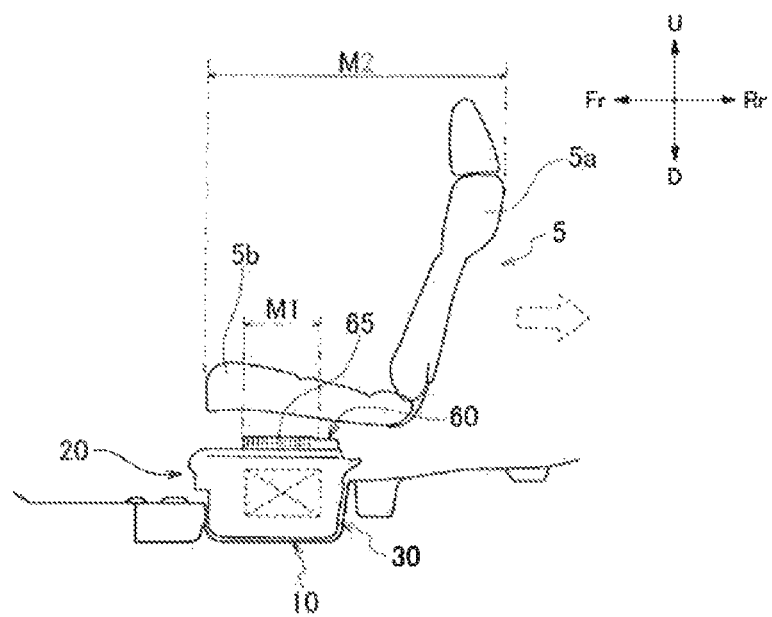
FIG. 6B is a schematic side view illustrating an arrangement configuration of the power equipment unit with respect to the front seat, and is a view illustrating a state where the front seat is positioned on a most rear side.

FIGS. 6A and 6B are views for explaining a position relation between the front seat 5 and the intake port 65 of the cover member 60. FIG. 6A is a view illustrating a state where the front seat 5 moving along the seat rail 18 (see FIG. 2) in the front and rear direction is positioned on a most front side. FIG. 6B is a view illustrating a state where the front seat 5 is positioned on a most rear side. Incidentally, in the same drawings, the seat rail 18 is not illustrated. As illustrated in the same drawings, in both the state where the front seat 5 is positioned on the most front side and the state where the front seat 5 is positioned on the most rear side, the intake port 65 of the cover member 60 is right below the front seat 5. That is, even in the state the front seat 5 moving along the seat rail 18 in the front and rear direction is in any positions, an intake port range M1 is configured to be included in a seat range M2.

In the case structure of this embodiment, in this manner, in any one of the state where the front seat 5 moves to the most front side of the vehicle 1 and the state where the front seat 5 moves to the most rear side, the intake port 65 is configured to be positioned right under the front seat 5. Thus, it can be prevented more effectively that liquid such as water is infiltrated from the intake port 65 into the case body 31.

Incidentally, the present invention is not limited to the above-described embodiment, but can be changed or improved properly.

For example, in the above-described embodiment, the power equipment unit containing part 10 containing the power equipment unit 20 is provided below the front seat 5. However, the power equipment unit containing part 10 may be provided below the middle seat 6 or below the rear seat 7 as well as below the front seat 5.

In addition, the battery 50 is exemplarily illustrated as power equipment. However, the power equipment is not limited to the battery, and may be an inverter, a DC/DC converter, and the like. In the power equipment unit, these components may be contained singly or in a combined form in a case.

In addition, the hybrid vehicle is exemplarily illustrated as the vehicle 1. However, the vehicle 1 is not limited thereto, and may be an electric vehicle, a fuel battery vehicle, and the like.

DESCRIPTION OF REFERENCE NUMERALS AND CHARACTERS

1 vehicle
5 front seat (seat)
20 power equipment unit
31 case body
40 lid member
41 opening part
42 circumferential wall
43 recess part
44 drain passage
45 drain port
46 rear vertical wall
50 battery (power equipment)
60 cover member
61 upper wall
62 front wall
65 intake port
67 partition wall part
71 space part

The invention claimed is:

1. A case structure of a power equipment unit which contains power equipment mounted in a vehicle, the case structure comprising:
   a case body which contains the power equipment and an upper portion of which is open;
   a lid member which covers the upper portion of the case body; and
   a cover member which is attached to the lid member and which covers at least an opening part formed in the lid member, wherein:
   an intake port for taking in air from outside is formed in the cover member;
   a space part is formed between the cover member and the lid member;
   the opening part of the lid member is surrounded by a circumferential wall having a cylindrical shape; and
   a drain passage communicating with a drain port is connected with an outer circumference of the circumferential wall.

2. The case structure of the power equipment unit according to claim 1, wherein:
   a recess part having an annular shape is provided in the outer circumference; and
   the drain passage is connected with the recess part.

3. The case structure of the power equipment unit according to claim 2, wherein
   the recess part and the drain passage are formed by concaving the lid member.

4. The case structure of the power equipment unit according to claim 1, wherein:
   the intake port is provided on one surface of the vehicle in a front and rear direction; and
   the drain port is provided on an other surface of the vehicle in the front and rear direction.

5. The case structure of the power equipment unit according to claim 1, wherein
   the drain passage is tilted downward toward the drain port.

6. The case structure of the power equipment unit according to claim 1, wherein:
   in the cover member, a partition wall part is provided between the intake port and the opening part to extend downward from an upper wall; and
   a lower end of the partition wall part is positioned below an upper end of the opening part and below a lower end of the intake port.

7. The case structure of the power equipment unit according to claim 1, wherein
   the power equipment includes a vehicle driving battery.

8. The case structure of the power equipment unit according to claim 1, wherein
   the power equipment unit is arranged under a seat.

9. The case structure of the power equipment unit according to claim 8, wherein
   the intake port is arranged to be positioned under the seat even in a state where the seat moves to a most front side or a most rear side of the vehicle.

* * * * *